United States Patent
Rock et al.

(10) Patent No.: US 11,752,518 B2
(45) Date of Patent: Sep. 12, 2023

(54) ROBOT-CENTERED COATING SYSTEM WITH MULTIPLE CURING WORKSTATIONS

(71) Applicant: SST Systems, Inc., Sturgeon Bay, WI (US)

(72) Inventors: Robert G. Rock, Sturgeon Bay, WI (US); Chad Martin Andreae, Sturgeon Bay, WI (US)

(73) Assignee: SST Systems, Inc.

( * ) Notice: Subject to any disclaimer, the term of this patent is extended or adjusted under 35 U.S.C. 154(b) by 48 days.

(21) Appl. No.: 17/338,348

(22) Filed: Jun. 3, 2021

(65) Prior Publication Data
US 2022/0388025 A1 Dec. 8, 2022

(51) Int. Cl.
*B05C 3/10* (2006.01)
*B05D 1/18* (2006.01)
*B05D 3/00* (2006.01)
*B05D 3/02* (2006.01)
*B05C 13/00* (2006.01)
(Continued)

(52) U.S. Cl.
CPC ............ *B05D 1/18* (2013.01); *B05C 3/08* (2013.01); *B05C 3/10* (2013.01); *B05C 9/14* (2013.01); *B05C 13/00* (2013.01); *B05D 3/002* (2013.01); *B05D 3/0272* (2013.01);
(Continued)

(58) Field of Classification Search
CPC .. B05C 3/10; B05C 3/08; B05D 3/002; B05D 3/0272; B05D 7/142; B05D 1/18
See application file for complete search history.

(56) References Cited

U.S. PATENT DOCUMENTS 2,615,421 A 10/1952 Davis et al.
2,869,508 A 1/1959 Pelavin
(Continued)

FOREIGN PATENT DOCUMENTS

JP 2009057593 A * 3/2009
WO WO2012071499 A1 5/2012

OTHER PUBLICATIONS

SlideShare, "Wrist Motion", website, https://www.slideshare.net/ganeshmrgn/robots-one-day-presentation, Published Mar. 26, 2018, (1 Page).
(Continued)

*Primary Examiner* — Karl Kurple
(74) *Attorney, Agent, or Firm* — Michael Best & Friedrich LLP

(57) ABSTRACT

A coating system includes a plurality of liquid immersion workstations positioned along an arcuate path, the plurality of liquid immersion workstations defining a single complete coating process for a sequence of objects. A plurality of curing workstations are configured to independently receive objects of the sequence of objects exiting the plurality of liquid immersion workstations. An articulated robotic arm has a base positioned inside the arcuate path in top plan view such that the robotic arm is operable to carry each object of the sequence of objects through each of the plurality of liquid immersion workstations and to exactly one of the plurality of curing workstations. An articulated robotic hand is provided at a distal end of the robotic arm and configured to grasp and hold each of the objects and to oscillate the object while submerged in each of the plurality of liquid immersion workstations.

21 Claims, 10 Drawing Sheets

(51) Int. Cl.
*B25J 11/00* (2006.01)
*B05C 3/08* (2006.01)
*B25J 17/02* (2006.01)
*B05C 9/14* (2006.01)
*B25J 15/02* (2006.01)

(52) U.S. Cl.
CPC ....... *B25J 11/0075* (2013.01); *B25J 15/0213* (2013.01); *B25J 17/0283* (2013.01)

(56) References Cited

U.S. PATENT DOCUMENTS

| | | | |
|---|---|---|---|
| 2,869,509 A | | 1/1959 | Woods |
| 2,872,893 A | | 2/1959 | Kling |
| 3,062,225 A | | 11/1962 | Mans |
| 3,687,421 A | | 8/1972 | Kanazu |
| 3,849,284 A | | 11/1974 | Kossmann |
| 3,919,070 A | | 11/1975 | Goold et al. |
| 4,062,752 A | | 12/1977 | Peterson |
| 4,399,828 A | | 8/1983 | Kontos |
| 4,485,761 A | | 12/1984 | Stewart |
| 4,676,881 A | | 6/1987 | Davidson |
| 4,883,578 A | | 11/1989 | Jowitt et al. |
| 4,908,153 A | | 3/1990 | Kossmann et al. |
| 4,915,210 A | | 4/1990 | Jowitt et al. |
| 4,938,337 A | | 7/1990 | Jowitt et al. |
| 5,092,975 A | * | 3/1992 | Yamamura ............. C25D 17/00 204/201 |
| 5,096,564 A | | 3/1992 | Jowitt et al. |
| 5,120,410 A | * | 6/1992 | Herdzina, Jr. ......... C25D 13/14 118/409 |
| 5,264,253 A | * | 11/1993 | Ruehl ...................... B05C 3/00 427/430.1 |
| 5,419,823 A | | 5/1995 | Lazaro et al. |
| 5,490,917 A | | 2/1996 | Lazaro et al. |
| 5,562,810 A | * | 10/1996 | Urquhart ................ C25D 17/28 204/213 |
| 5,851,368 A | | 12/1998 | Rumph |
| 6,205,368 B1 | * | 3/2001 | Hirahara ........... H01L 21/67276 700/121 |
| 6,776,880 B1 | | 8/2004 | Yamazaki |
| 6,887,363 B2 | | 5/2005 | Andreae et al. |
| 7,341,633 B2 | | 3/2008 | Lubomirsky et al. |
| 7,399,362 B2 | | 7/2008 | Pohl et al. |
| 7,503,976 B2 | * | 3/2009 | Gilmore ............... B22D 31/005 118/66 |
| 7,567,855 B2 | * | 7/2009 | Salamanca ........... B02C 17/205 901/1 |
| 7,650,852 B2 | | 1/2010 | Clifford et al. |
| 8,498,740 B2 | * | 7/2013 | Truttmann ............. B22D 41/22 222/597 |
| 9,481,518 B2 | | 11/2016 | Neiser |
| 2003/0005885 A1 | * | 1/2003 | Mueller ............. B65G 49/0459 29/25.01 |
| 2003/0094363 A1 | | 5/2003 | Andreae et al. |
| 2003/0132115 A1 | * | 7/2003 | Andreae ................ C25D 13/22 204/500 |
| 2004/0206373 A1 | * | 10/2004 | Donoso ............. H01L 21/67051 134/33 |
| 2005/0160975 A1 | * | 7/2005 | Gilmore ............... B05D 3/0486 118/66 |
| 2005/0263066 A1 | * | 12/2005 | Lubomirsky ..... H01L 21/67155 118/728 |
| 2006/0130751 A1 | * | 6/2006 | Volfovski .......... H01L 21/67109 118/300 |
| 2006/0169203 A1 | * | 8/2006 | Ito ........................ B05B 16/405 118/62 |
| 2006/0172076 A1 | * | 8/2006 | Rearick .................... B05D 7/52 427/430.1 |
| 2007/0111519 A1 | * | 5/2007 | Lubomirsky ..... H01L 21/02068 257/E21.174 |
| 2008/0145531 A1 | * | 6/2008 | Rosynsky .............. B05D 3/042 427/231 |
| 2012/0272939 A1 | * | 11/2012 | Grace, Jr. ................. F41B 5/10 205/109 |
| 2018/0243928 A1 | * | 8/2018 | Haddadin .................. B25J 9/06 |
| 2019/0291069 A1 | * | 9/2019 | McIntosh ................ B01F 33/84 |

OTHER PUBLICATIONS

SlideShare, "Robot Centered Work Cell", website, https://www.slideshare.net/ganeshmrgn/10-robotic-manufacturing-systems, Published May 31, 2016, (1 Page).

* cited by examiner

ROBOT-CENTERED COATING SYSTEM WITH MULTIPLE CURING WORKSTATIONS

BACKGROUND

The present invention relates to systems for coating objects, for example e-coating manufactured articles. In the interests of capacity and efficiency, such systems typically require significant stretches of floor space and include conveyors with significant mechatronic hardware for dipping and tilting actions at the various workstations along the conveyor path. Extended length curing ovens are provided to meet the requisite curing time as the objects continue along the conveyor after being coated.

SUMMARY

In one aspect, the invention provides a coating system including a plurality of liquid immersion workstations positioned along an arcuate path, the plurality of liquid immersion workstations defining a single complete coating process for a sequence of objects. A plurality of curing workstations are configured to independently receive objects of the sequence of objects exiting the plurality of liquid immersion workstations defining the coating process. An articulated robotic arm has a base positioned inside the arcuate path in top plan view such that the robotic arm is operable to carry each object of the sequence of objects through each of the plurality of liquid immersion workstations and to exactly one of the plurality of curing workstations. An articulated robotic hand is provided at a distal end of the robotic arm and configured to grasp and hold each of the objects and to oscillate the object while submerged in each of the plurality of liquid immersion workstations.

In another aspect, the invention provides a coating system including a plurality of liquid immersion workstations positioned along an arcuate path, the plurality of liquid immersion workstations defining a single complete coating process. The plurality of liquid immersion workstations includes at least one pretreatment workstation, a liquid immersion coating application workstation, and at least one post rinse workstation. An articulated robotic arm has a base positioned inside the arcuate path in top plan view such that the robotic arm is pivotable about a first axis extending through its base for a distal end of the robotic arm to extend over each of the plurality of liquid immersion workstations. A plurality of curing workstations are provided within reach of the distal end of the robotic arm, each of the plurality of curing workstations configured to independently receive objects exiting the coating process. An articulated robotic hand is provided at the distal end of the robotic arm and configured to grasp and hold an object to be processed by the coating process throughout the plurality of liquid immersion workstations and to one of the plurality of curing workstations. A controller is coupled to the robotic arm and programmed with instructions to: control the robotic arm for movement of the object between the workstations of the plurality of liquid immersion workstations and subsequently to one of the plurality of curing workstations, control the robotic arm to submerge the object in each of the plurality of liquid immersion workstations, and control the robotic hand to oscillate the object while submerged in each of the plurality of liquid immersion workstations.

In yet another aspect, the invention provides a method of processing objects through a coating system. A plurality of liquid immersion workstations are provided, each having a liquid immersion tank associated with a coating process, the plurality of liquid immersion workstations arranged along an arcuate path. A first one of the objects is carried with an articulated robotic arm through the plurality of liquid immersion workstations along the arcuate path, and the robotic arm is articulated at each of the plurality of liquid immersion workstations to immerse and subsequently lift the first object. A robotic hand at a distal end of the robotic arm is articulated to oscillate the first object while the robotic arm holds the first object immersed in the liquid of the liquid immersion tank of each of the plurality of liquid immersion workstations. The first object is delivered from a final one of the plurality of liquid immersion workstations into a first curing workstation using the robotic arm. A second one of the objects is carried with the robotic arm through the plurality of liquid immersion workstations along the arcuate path, and the robotic arm is articulated at each of the plurality of liquid immersion workstations to immerse and subsequently lift the second object. The robotic hand is articulated to oscillate the second object while the robotic arm holds the second object immersed in the liquid of the liquid immersion tank of each of the plurality of liquid immersion workstations. The second object is delivered from the final one of the plurality of liquid immersion workstations into a second curing workstation using the robotic arm, while the first object remains in the first curing workstation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
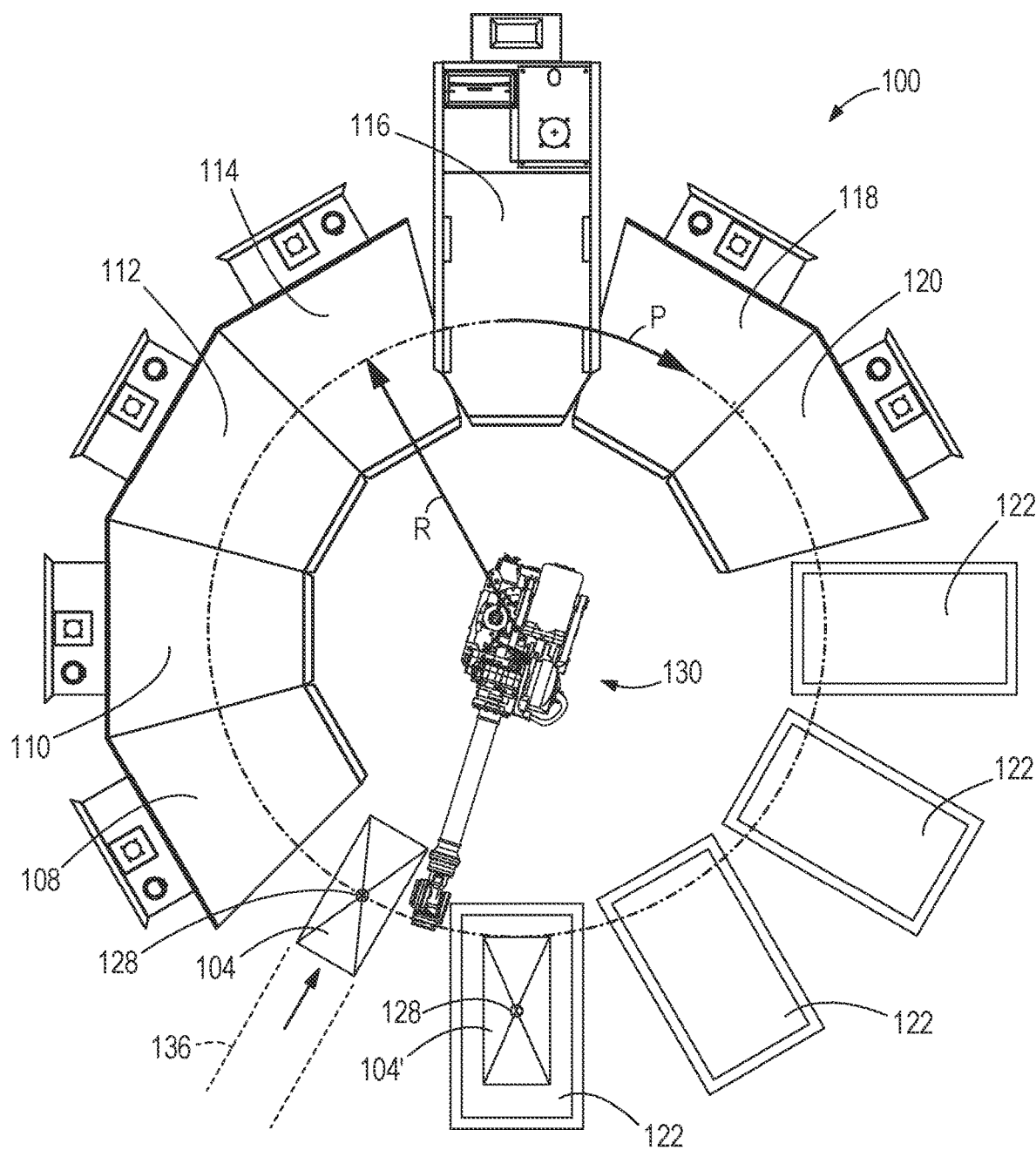
FIG. 1 is a top plan view of a coating system according to one aspect of the invention, also illustrating a first method step.
Figure 2:
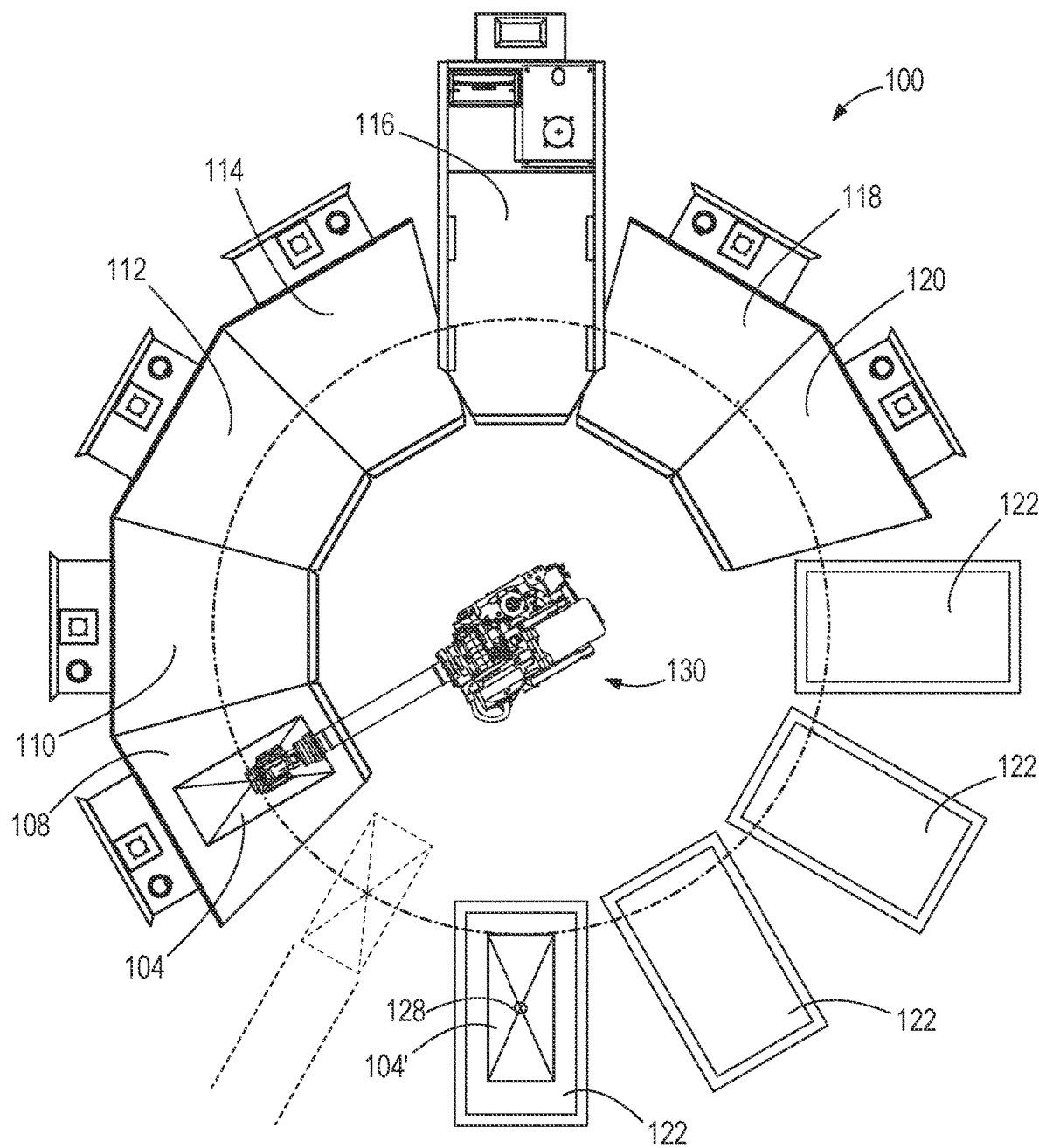
FIG. 2 is a top plan view of the coating system shown in FIG. 1, also illustrating a second method step.
Figure 3:
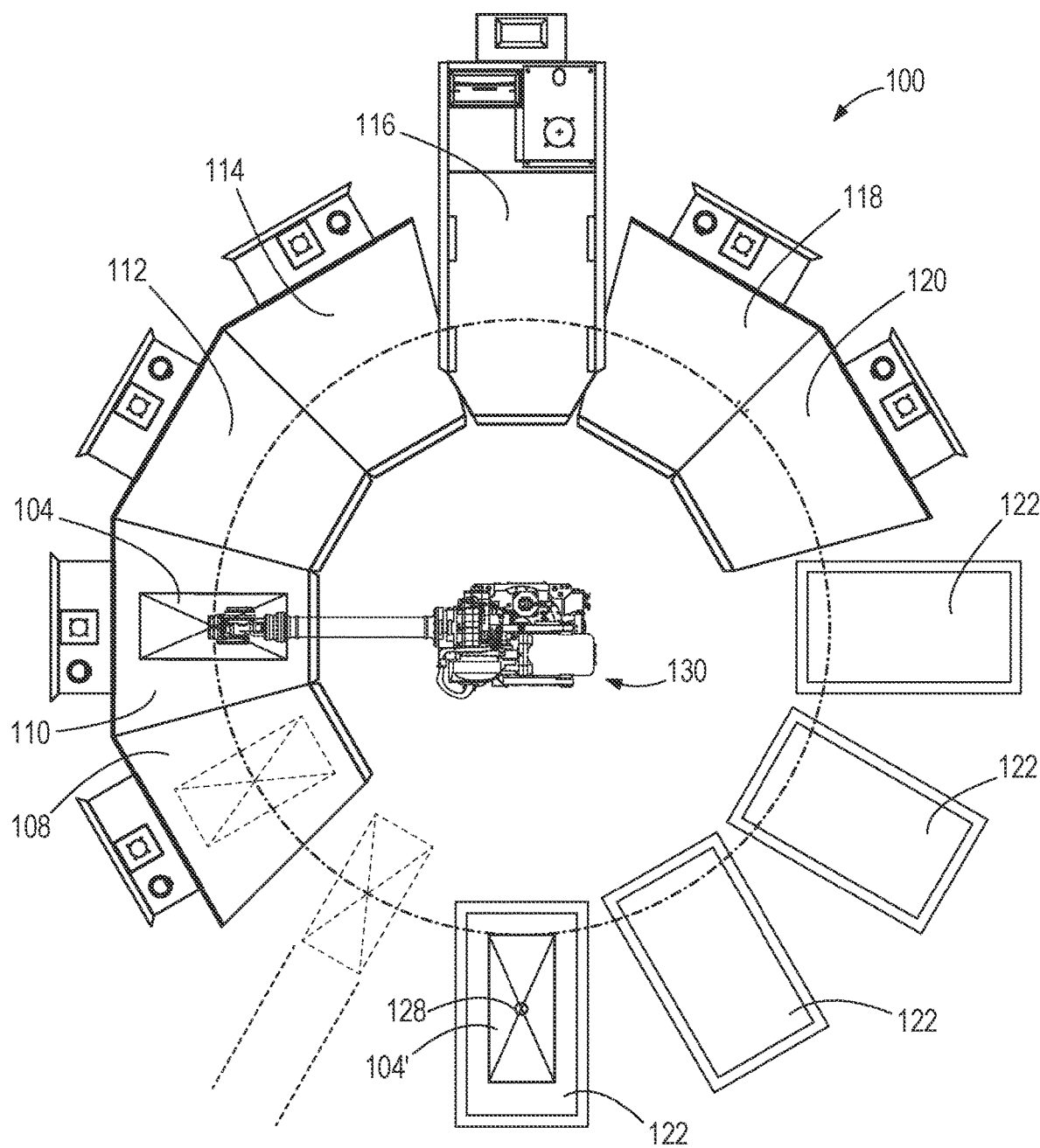
FIG. 3 is a top plan view of the coating system shown in FIG. 1, also illustrating a third method step.
Figure 4:
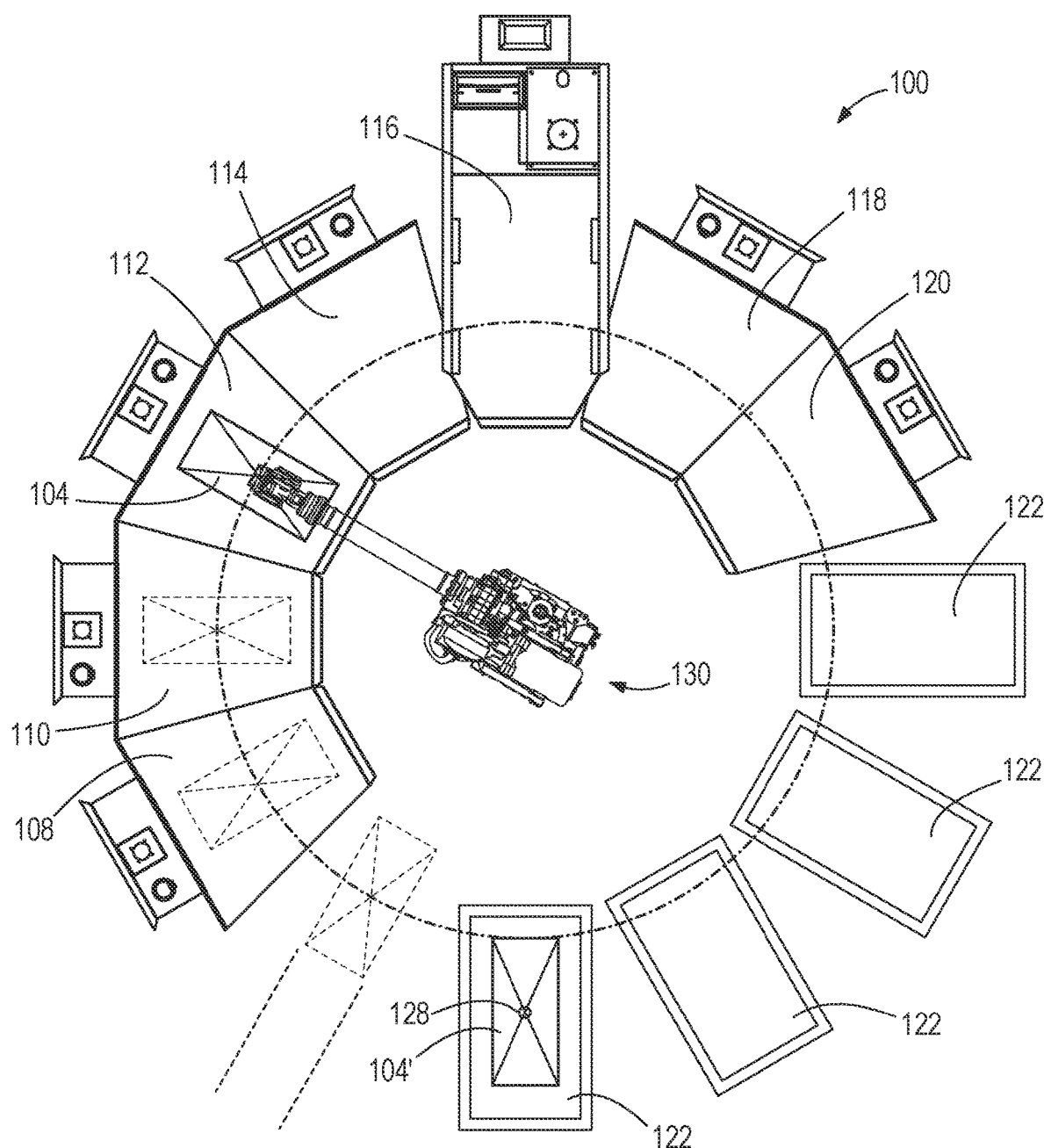
FIG. 4 is a top plan view of the coating system shown in FIG. 1, also illustrating a fourth method step.
Figure 5:
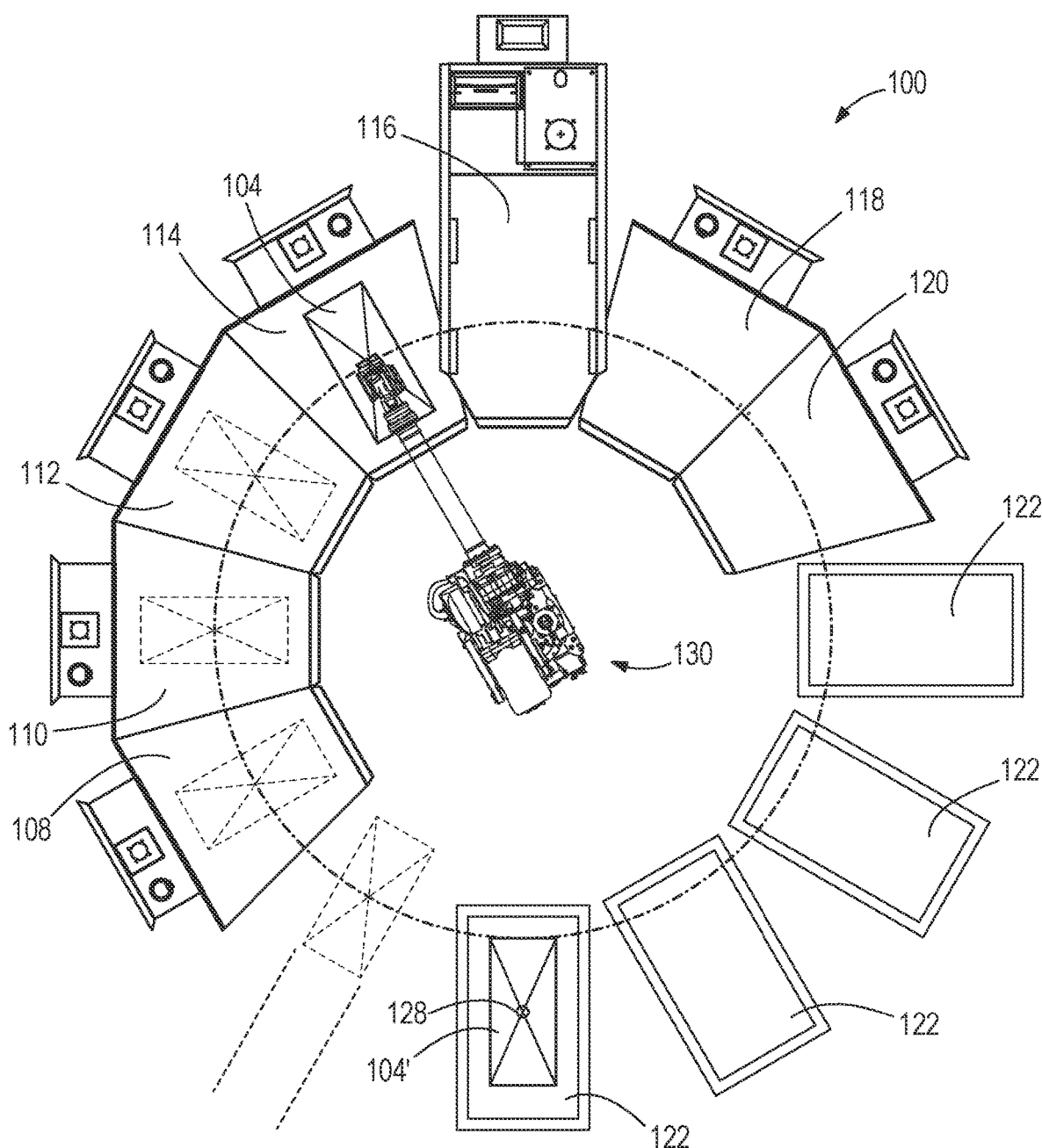
FIG. 5 is a top plan view of the coating system shown in FIG. 1, also illustrating a fifth method step.
Figure 6:
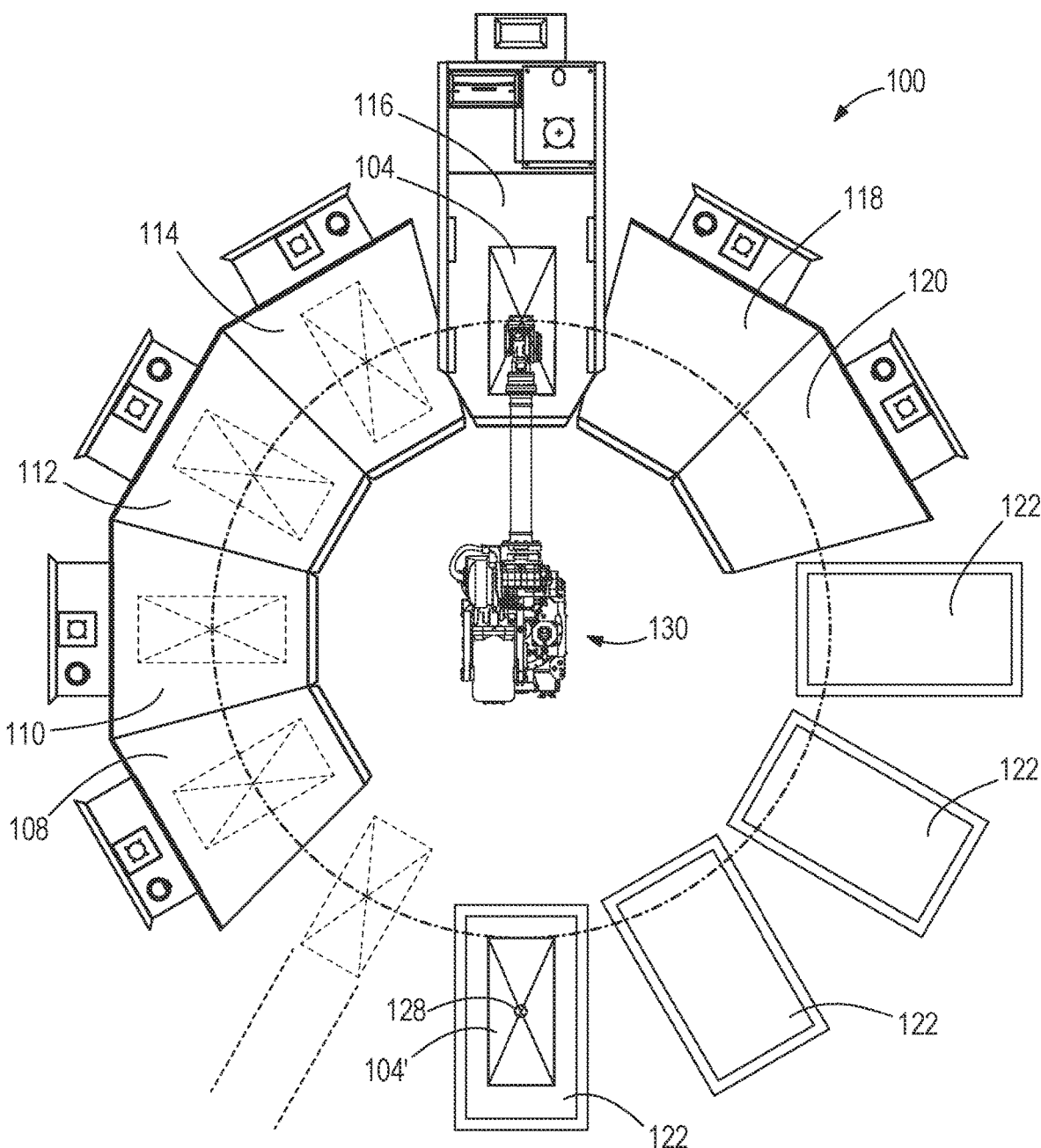
FIG. 6 is a top plan view of the coating system shown in FIG. 1, also illustrating a sixth method step.
Figure 7:
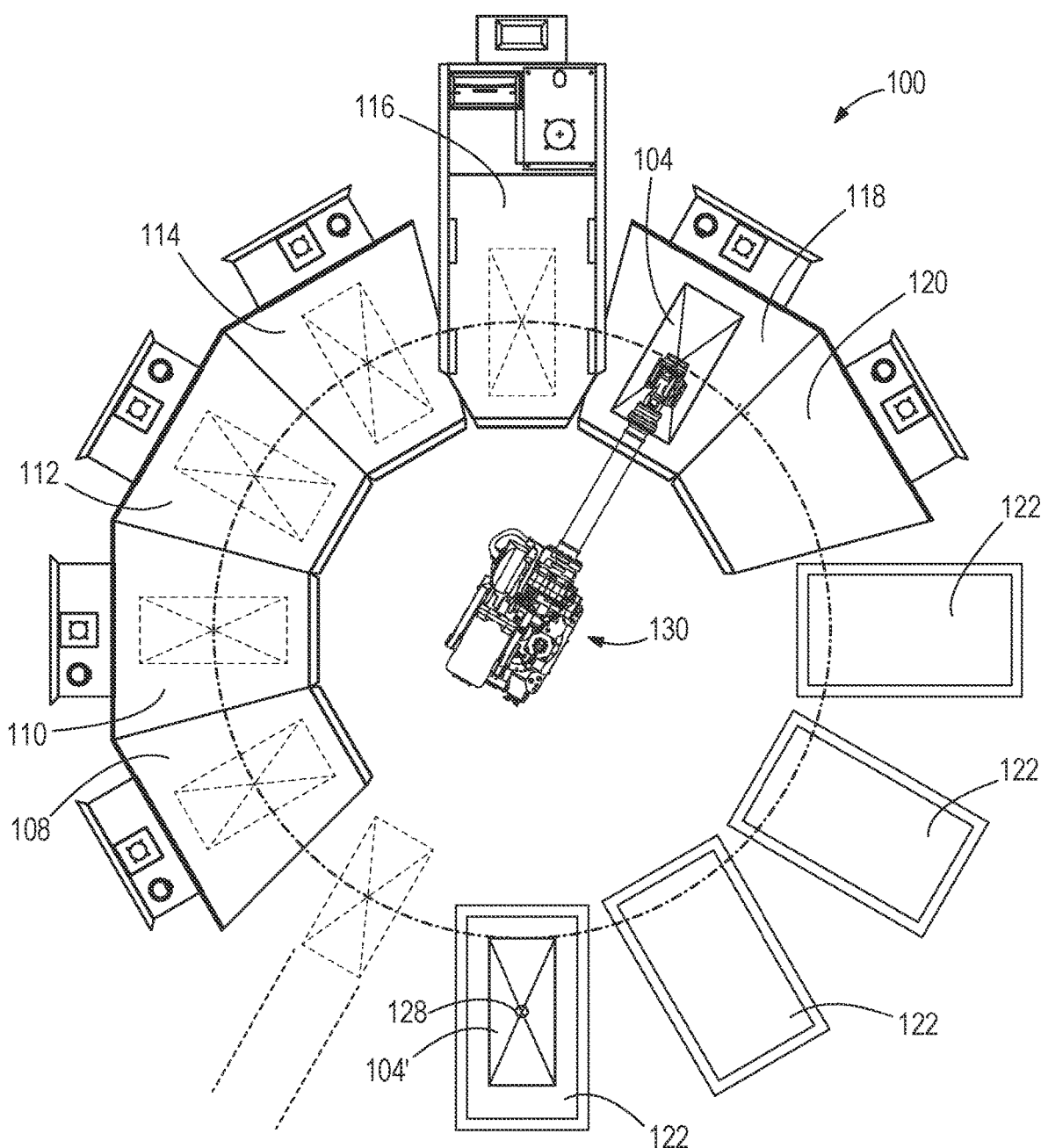
FIG. 7 is a top plan view of the coating system shown in FIG. 1, also illustrating a seventh method step.
Figure 8:
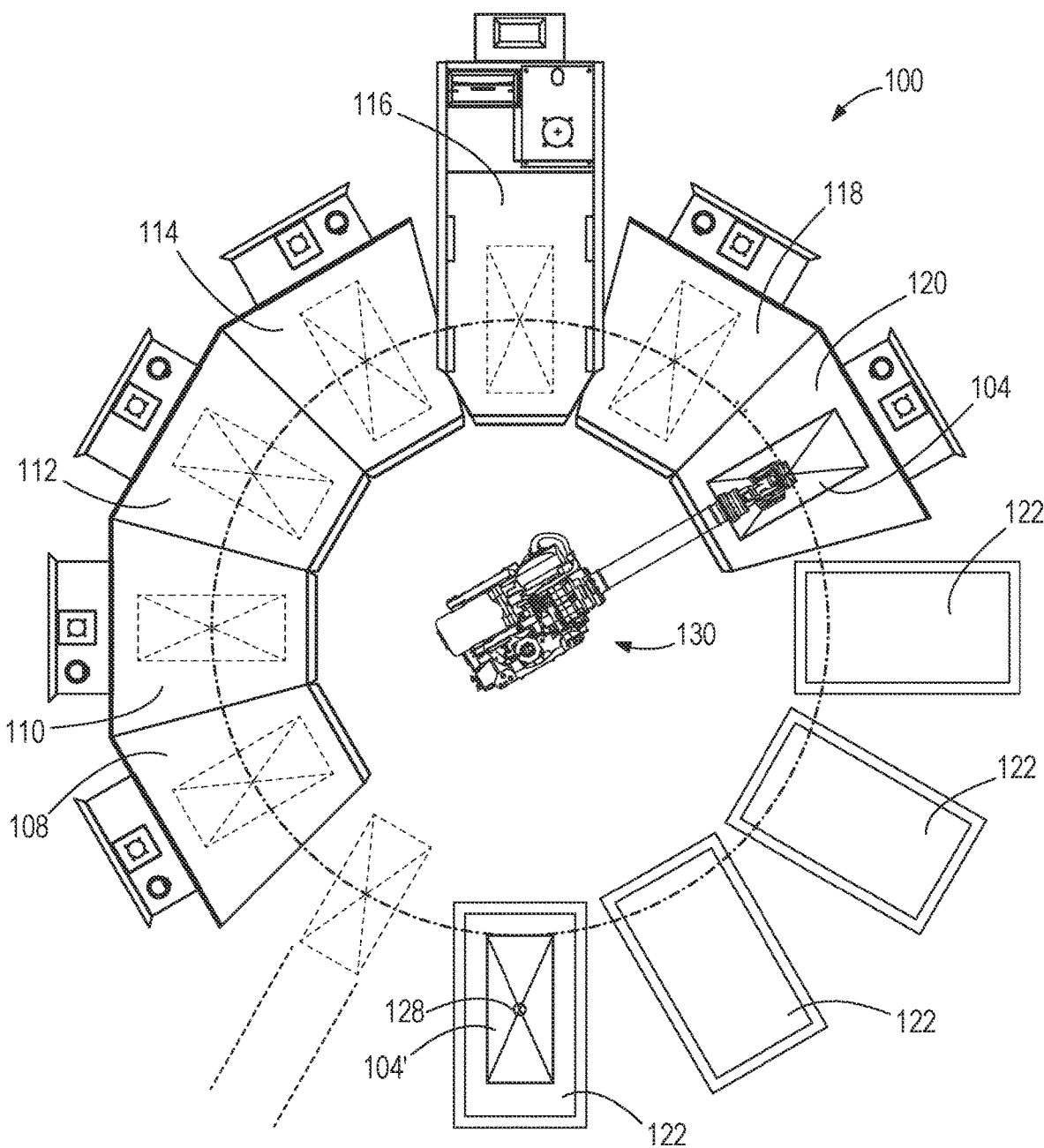
FIG. 8 is a top plan view of the coating system shown in FIG. 1, also illustrating a eighth method step.
Figure 9:
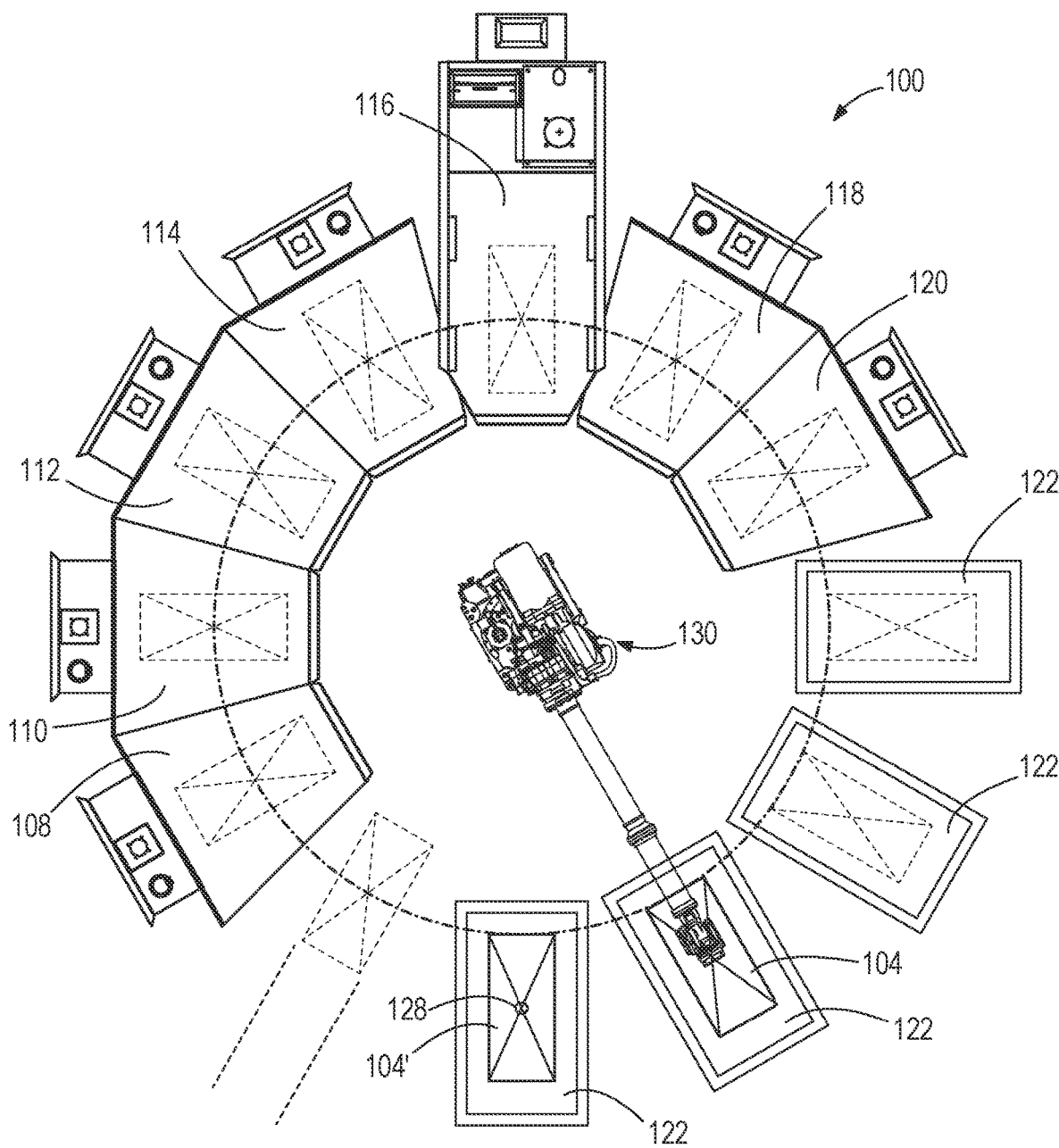
FIG. 9 is a top plan view of the coating system shown in FIG. 1, also illustrating a ninth method step.

FIG. 1 illustrates an industrial treatment system 100 for processing objects 104 through a plurality of sequential workstations 108 to 122. As described further below, some or all of the workstations 108 to 122 are unaligned, or in other words, not arranged in a linear row. Rather, as described further below, some or all of the workstations 108 to 122 are arranged along an arcuate path P. The objects 104 can be unfinished manufactured articles, or "work pieces," for example cast and/or machined metal items (e.g., aluminum alloy). It should be appreciated that the object 104 is represented by the rectangular box with the "X" as a means of convenience, and the object 104 may have this or another shape. For example, the box in the drawing can represent a "product envelope," which is a space in which the object 104 resides. The system 100 can process a sequence of identical copies of the same object 104, simple variations thereof, or entirely different objects, one after the next. It is also noted that the object 104 can in some constructions represent a holder such as a fixture, container, bin, basket, etc. (e.g., liquid permeable basket) used for holding one or a plurality of work pieces desired to be coated. Such a holder may carry one or more to-be-coated work pieces through the process. If used, the work piece holders may be re-used repeatedly to carry different work pieces through the process, and the holders effectively serve as part of the system 100, although not fixed in place. Regardless of whether the object 104 is a work piece to be coated or a holder configured to carry one, two, or more work pieces, the object 104 can have at least one engagement structure 128 thereon for material handling purposes—for engagement by an articulated robotic arm 130.

In some constructions, the process provided by the system 100 is a coating process configured to apply a finish coating (e.g., paint) to the work pieces. Other than finish coating, the work pieces may be complete, fully-formed and/or manufactured articles. The system 100 includes a series of sequential workstations 108 to 120 that define a single coating process that is complete up to the point of coating curing. Each of the workstations 108 to 120 can be liquid immersion workstations provided with a liquid immersion tank into which the objects 104 are dipped by the articulated robotic arm 130. In some constructions, some or all of the tanks have pumps, agitators, fill/drain ports, etc. The coating process can be an e-coat process, also known as electrophoretic painting or electropainting. In the e-coat process, the work piece is first prepared for painting and then immersed into a water bath containing resin with or without pigments, and any desired additives. In one particular example, the workstations are as follows: 108) clean; 110) rinse; 112) conversion coat; 114) rinse; 116) e-coat application; 118) post rinse #1; and 120) post rinse #2. In the e-coat application workstation 116, opposite electrical charge is provided between the bath and the object 104 to promote adhesion of the paint particles onto the work piece, promoting uniform, complete coverage. The system 100 additionally provides a plurality of curing workstations 122 (or "ovens") downstream of the final liquid immersion workstation 120 (e.g., final post rinse) through which objects 104 are processed. Each curing workstations 122 can define an internal oven chamber heated to a cure temperature in excess of 300 degrees Fahrenheit and configured to hold the object 104 for a predetermined cure cycle time that hardens the coating applied to the work piece by the coating process just prior.

Some or all of the liquid immersion workstations 108 to 120 are arranged along an arcuate path P in top plan view. An upstream end of the arcuate path P can be defined by a loading/unloading zone in which there is no liquid immersion tank but rather a space for objects 104 to be delivered to the arcuate path P and into reach of the robotic arm 130 (e.g., by conveyor(s) 136). The loading/unloading zone may be considered a workstation, although not part of the coating process, per se, as there is no treatment by any liquid immersion bath until the first liquid immersion workstation 108. The arcuate path P can be a curved path of varied or constant radius R. As illustrated, the path P extends along a constant radius R that bisects each of the workstations 108 to 120. Each of the workstations 108 to 120 is wedge-shaped, having a relatively smaller width at a radially interior portion and a relatively larger width at a radially exterior portion. Each of the workstations 108 to 120 is centered (in circumferential direction) on a radially-extending reference line in the illustrated construction, and the spacing between the radial reference lines can be uniform or variable among the workstations. As illustrated, the system 100 occupies exactly 360 degrees about a central axis, with every workstation (including the curing workstations 122 and the loading/unloading workstation) spaced 30 degrees apart. This arrangement eliminates wasted circumferential space. The plurality of liquid immersion workstations 108 to 120 extends over at least a 90-degree span about the central axis (e.g., 120 degrees or 180 degrees). Some or all of the workstations 108 to 120 can have matching size and/or shape (e.g., trapezoid). in some constructions, some or all of the workstations 108 to 120 can have other shapes such as rectangular or round.

Figure 10:
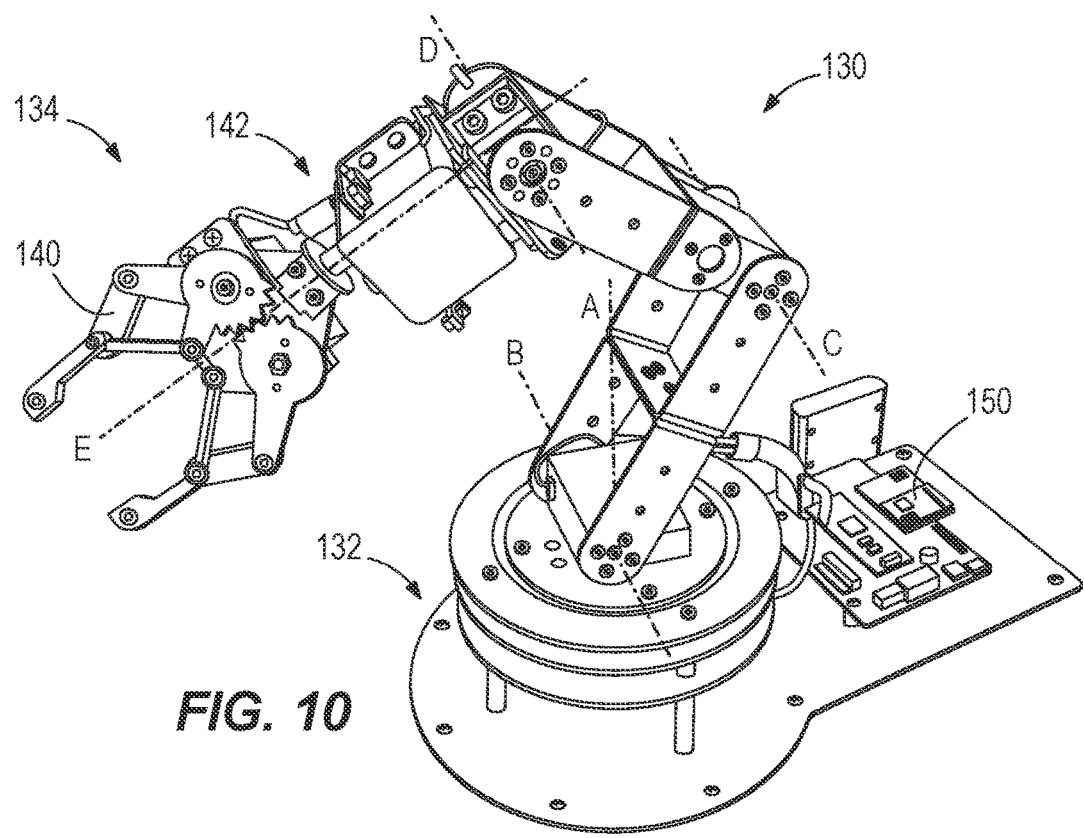
FIG. 10 is a perspective view of a robotic arm of the coating system of FIGS. 1-9.

Within the arcuate path P, a base 132 of the robotic arm 130 is positioned so as to enable a distal end 134 of the robotic arm 130 to extend over top of each of the workstations 108 to 120. Thus, the robotic arm 130 is configured to handle the movement of each object 104 from workstation to workstation (e.g., by pivoting of the robotic arm 130 on its base 132 about a first axis A—FIG. 10) and to handle the dipping and lifting of each object 104 at each of the workstations 108 to 120. The base 132 can be fixed to the floor to define a fixed relationship with each of the stationary workstations 108 to 122. The first axis A of the robotic arm 130 can be the "central axis" referred to above, although there may be an offset between these axes in other constructions. The curing workstations 122 are also within reach of the distal end 134 of the robotic arm 130, and may optionally be positioned so that the path P (e.g., constant radius R) extends at least partially over the curing workstations 122, although not necessarily bisecting them as objects 104 may be inserted from the side, such as the radially inboard side, rather than the top. In alternate constructions, the various curing workstations 122 are positioned at a different height than the liquid immersion workstations 108 to 120 or at a different height from other of the curing workstations 122. For example, curing workstations 122 may be stacked above at least some of the liquid immersion workstations 108 to 120, or the curing workstations themselves are vertically stacked, to further reduce floor space requirements of the system 100. Although not required in all constructions, an entry to each of the curing workstations 122 is equidistant from the first axis A about which the robotic arm 130 is rotatable with respect to its base 132. The first axis A can be vertical and as such would appear as a single point in top plan view. The first axis A can be positioned at the center of the arcuate path P as shown. The robotic arm 130 can include a plurality of pivot axes A, B, C, D, among various sections thereof to afford the articulation capability between the base 132 and the robotic arm's distal end 134.

The distal end 134 includes a robotic hand 140. A wrist joint 142 couples the hand 140 to the remainder of the robotic arm 130. The robotic hand 140 can be an anthropomorphic hand, a multi-fingered hand, or a more simplistic gripper or general "end effector" configured to handle the objects 104 by the respective engagement structures 128. The engagement structures 128 can be standardized amongst various objects 104, although the robotic hand 140 may be operable with a number of diverse engagement structures to handle the objects 104. The distalmost pivot axis E provides rotational movement of the hand 140 on the arm 130, at least within a limited range (e.g., at least +/−5 degrees, though perhaps not exceeding +/−45 degrees). No conveyor system runs along or above the workstation path P, as all of the handling of the objects 104 through the process is handled by the robotic arm 130, which can be the one and only device for handling each object 104 from the first workstation 108 of the coating process through to one of the curing workstations 122. When positioned at the corresponding liquid immersion workstations 108 to 120 of the coating process, the robotic hand 140 is articulated to oscillate the object 104 underwater. However, if desired, the robotic arm 130 may also articulate rearward of the hand 140 to further oscillate the object 104. As such, oscillation may occur in multiple directions about multiple axes, and these movements carried out sequentially or simultaneously may further enhance liquid coverage by effectively eliminating the occurrence of a sustained air bubble on any given portion of the work piece. Thus, uniform, complete coating of the work piece is obtained. In some constructions, similar oscillations or basic tilting operations from the robotic arm 130 can facilitate liquid drainage after lifting the object 104 from any of the liquid immersion tanks.

Figure 11:
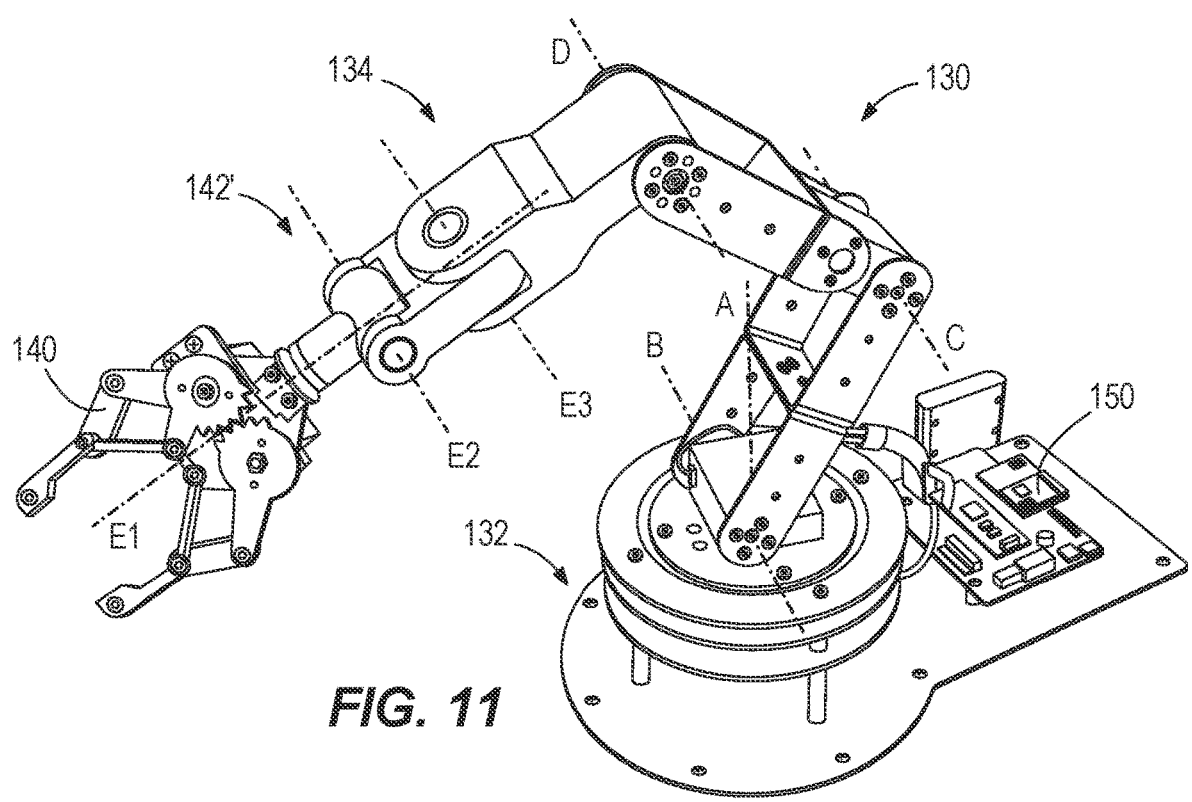
FIG. 11 is a perspective view of an alternate robotic arm with a multi-DOF wrist joint.

In a more advanced construction shown in FIG. 11, the robot arm 130 can include a wrist joint 142' providing multiple degrees of freedom (DOF) between the robotic hand 140 and the arm 130 on which it is supported for motion. In particular, rather than the single axis E for pivotal movement of the robotic hand 140 on the distal end 134 of the arm 130, the wrist joint 142' of FIG. 11 provides a roll axis E1, a pitch axis E2, and a yaw axis E3. Each of these axes E1, E2, E3 is perpendicular to the other two. When equipped with the wrist joint 142', sequential or simultaneous multi-axis oscillation of the object 104 can be performed by articulation of the robotic hand 140 about the wrist joint 142'. If desired, the remainder of the robotic arm 130 may remain motionless during the oscillation imparted by articulating the hand 140. For example, the robotic hand 140 may be articulated about two or all three of the roll, pitch, and yaw axes E1, E2, E3 sequentially while immersed in the liquid at some or each one of the liquid immersion workstations 108 to 120. In other constructions, articulation of the robotic hand 140 to oscillate the object 104 while immersed includes simultaneous articulation about two or more of the axes E1, E2, E3. Oscillations can be small back-and-forth movements (e.g., 15 degrees or less from a neutral orientation about a given axis). In yet other constructions, multiple DOF for the robotic hand 140 can be provided by a wrist joint in the form of a spherical "ball" joint.

A controller 150 (FIG. 10) coupled to the robotic arm 130 is programmable and includes memory and stored instructions for operating the robotic arm 130, including the hand 140, to perform all the material handling of the objects 104 between the loading/unloading zone and the curing workstations 122. Thus, all of the steps described below relating to the robotic arm movements are carried out under control of the controller 150. The controller 150 can be the same as or in communication with a controller that monitors and optionally controls aspects of the various coating process parameters (e.g., immersion bath temperature, electrical charge, liquid level, cycle time, cure temperature, etc.). The process parameters may also be monitored remotely on a separate electronic device, by wired connection or wireless telemetry as desired. A method of operation of the system 100 is described with reference to FIGS. 1 to 9.

Beginning at FIG. 1, it is first noted that the object 104 is a subsequent or "second" object that follows processing of an earlier or "first" object 104'. The first object 104' occupies one of the curing workstations 122, e.g., the furthest one from the final liquid immersion workstation 120 and the nearest one to the loading/unloading zone. The first object 104' can be cured in a different one of the curing workstations 122 in other constructions, and the overall objective is to make use of all of the provided curing workstations 122 once the system 100 is up and running at capacity. For example, in the illustrated construction with four curing workstations 122, the curing cycle time for a coated object 104 may be at least three or four times the coating process time (i.e., the time needed to process the object 104 through the liquid immersion workstations 108 to 120). As such, the curing cycle time and the number of curing workstations 122 generally sets the total system capacity or maximum throughput. The design of the system 100 can in some aspects place a higher emphasis on mechanical simplicity, reliability, and reduced footprint than maximum throughput, as the system 100 may be implemented for relatively low volume specialized parts rather than processing high volumes of bulk work pieces.

Returning to the process as shown in FIG. 1, the object 104 is delivered to the loading/unloading zone, for example by the conveyor 136. Here, the object 104 is put into reach of the distal end 134 of the robotic arm 130. As such, the robotic arm 130 articulates into a position where the robotic hand 140 can grasp the engagement structure 128 on the object 104. The engagement structure 128 can be a handle, a loop, a hole, or any other structure that affords handling by the robotic hand 140, and the engagement structure 128 can be provided either directly on a to-be-coated work piece or on a holder for one or more work pieces as discussed above. Once engaged by the robotic hand 140, the object 104 is carried from the loading/unloading zone into the first liquid immersion workstation 108. Here the coating process begins by articulation of the robotic arm 130 into a position that submerges the object 104 into the liquid immersion tank of the workstation 108. This can be a cleaning process step whereby a cleaning solution in the liquid immersion tank cleans the surface of the work piece about to be coated. In some examples, the cleaning solution may be an acidic cleaning solution. During submersion, the robotic hand 140 articulates to oscillate the object 104, ensuring thorough coverage. Once a predetermined cycle time for the workstation 108 has elapsed, the object 104 is lifted out of the liquid immersion tank by articulation of the robotic arm 130 and allowed to drain. Articulation of the robotic hand 140 and/or the arm 130 may be repeated with the object 104 above the liquid immersion tank so as to enhance draining of the cleaning solution. The robotic arm 130 then advances the object 104 along the path P to each of the successive workstations 110, 112, 114, 116, 118, 120 in order. In some constructions, a given object 140 may be carried to and processed at only some of the system workstations, while skipping one or more others, which requires no specialized hardware but rather simple programming of the movement sequence of the robotic arm 130. Some or all of the above-mentioned steps are repeated at each of the workstations 110 to 120, including the robot articulations. Processing through these workstations 110 to 120 can include rinsing (e.g., rinsing off excess cleaning solution), application of a conversion coat, rinsing (e.g., rinsing off excess conversion coat solution), application of the final coating (e.g., electrically-charged e-coating), and multiple post-coating rinses (e.g., rinsing off excess final coating solution). The coating resulting from this coating process can be decorative and/or protective. However, the coating is to be cured at elevated temperature prior to completion into a finished, hardened coating.

As mentioned above, the curing of the coating takes place in any given one of the curing workstations 122. Following the final post rinse, the robot arm 130 is articulated to carry the object 104 to a designated one of the curing ovens 122 which is recently vacated. As each cure cycle is completed at one particular curing workstation 122, the robotic arm 130 is articulated to move the object 104 out of the curing workstation 122 and into the loading/unloading zone for removal from the system 100. The robotic arm 130 may perform this operation in between operations on successive objects 104 (just after placing an object 104 into a curing workstation 122 and just prior to picking up a new object 104 at the loading/unloading zone). As such, one (and only one) curing workstation 122 remains vacant as the robotic arm 130 operates to carry an object 104 through the coating process. This open curing workstation 122 then receives the object 104 from the robotic arm 130, and the robotic arm 130 proceeds to remove a longest-tenured object 104 from another one of the curing workstations 122. In other constructions, the object 104 may be staged briefly after taken out of the final liquid immersion workstation 120 as the robotic arm 130 removes a prior object from one of the curing workstations 122 to make space for the object 104. In yet other constructions, the robotic arm 130 can be one of two robotic arms positioned within the arcuate path P—either supported on the same base 132 or a separate base adjacent the base 132. Such a construction enables handling two objects 104 at once so that one robotic arm places a coated work piece into a curing workstation 122 just as a prior work piece is removed by the other robotic arm. In yet other constructions, cured objects may be removed from the curing workstations 122 by means other than the robotic arm 130. For example, an exit port may be provided from each curing workstation 122 (e.g., at a radially outer side). A conveyor within the curing workstation 122 can operate to eject the object 104. Alternately, objects 104 can be removed by a separate automated mechanism (e.g., robot) or even manually by human worker(s).

Various features and advantages of the invention are set forth in the following claims.

What is claimed is:

1. A coating system comprising:
   a plurality of liquid immersion workstations positioned along an arcuate path, the plurality of liquid immersion workstations defining a coating process for a sequence of objects, wherein the coating process defines, along the arcuate path, a single complete coating process of the plurality of liquid immersion workstations along the arcuate path, wherein the plurality of liquid immersion workstations are a series of sequential workstations along the arcuate path that define the single complete coating process with successive workstations placed in order along the arcuate path;
   a plurality of curing workstations configured to independently receive objects of the sequence of objects exiting the plurality of liquid immersion workstations defining the coating process;
   a robotic arm, wherein the robotic arm is an articulated robotic arm having a base positioned inside the arcuate path in top plan view such that the robotic arm is operable to carry each object of the sequence of objects through each of the plurality of liquid immersion workstations in order along the arcuate path and to exactly one of the plurality of curing workstations; and
   one articulated robotic hand provided at a distal end of the robotic arm and configured to grasp and hold each object of the sequence of objects and to oscillate each object of the sequence of objects while each object of the sequence of objects is submerged in each of the plurality of liquid immersion workstations,
   wherein the sequential workstations are located adjacent to one another such that the robotic arm is operable to carry the sequence of objects along the arcuate path in one circumferential direction to each of the successive workstations located in order along the arcuate path to exactly one of the plurality of curing workstations.

2. The coating system of claim 1, wherein the plurality of liquid immersion workstations extends over at least a 90-degree span about the articulated robotic arm.

3. The coating system of claim 1, wherein each of the plurality of objects is a holder for containing one or more manufactured articles to be coated, each of the plurality of objects having an engagement structure thereon for engagement by the robotic hand.

4. The coating system of claim 1, wherein the arcuate path is a circumferential path positioned at a constant radius about the articulated robotic arm.

5. The coating system of claim 4, wherein the plurality of curing workstations are also positioned along the arcuate path.

6. The coating system of claim 1, further comprising a loading zone positioned at an upstream end of the arcuate path adjacent a first one of the plurality of liquid immersion workstations.

7. The coating system of claim 1, wherein the coating process is an e-coat process, the plurality of liquid immersion workstations including, in order: clean, rinse, conversion coat, rinse, e-coat, and post rinse workstations.

8. The coating system of claim 1, wherein the articulated robotic arm includes at least three pivot axes providing separate axes of rotation between segments thereof.

9. The coating system of claim 1, wherein the robotic hand is supported on the robotic arm by a multi-degree-of-freedom wrist joint.

10. The coating system of claim 1, wherein each of the plurality of liquid immersion workstations is wedge-shaped in top plan view.

11. The coating system of claim 1, wherein the plurality of curing workstations includes at least three curing workstations.

12. A coating system comprising:
   a plurality of liquid immersion workstations positioned along an arcuate path, the plurality of liquid immersion workstations defining an e-coat process, wherein the plurality of liquid immersion workstations includes at least one pretreatment workstation, a liquid immersion coating application workstation, and at least one post rinse workstation, wherein the e-coat process is a single complete e-coat process along the arcuate path and the plurality of liquid immersion workstations are a series of sequential workstations along the arcuate path that define the single complete e-coat process with successive workstations placed in order along the arcuate path;
   a robotic arm, wherein the robotic arm is an articulated robotic arm having a base positioned inside the arcuate path in top plan view such that the robotic arm is pivotable about a first axis extending through its base for a distal end of the robotic arm to extend over each of the plurality of liquid immersion workstations, a plurality of curing workstations provided within reach of the distal end of the robotic arm, each of the plurality of curing workstations configured to independently receive objects exiting the coating process;

one articulated robotic hand provided at the distal end of the robotic arm and configured to grasp and hold an object to be processed by the coating process throughout the plurality of liquid immersion workstations in order along the arcuate path and to one of the plurality of curing workstations; and a controller coupled to the robotic arm and programmed with instructions to: control the robotic arm for movement of the object between the workstations of the plurality of liquid immersion workstations and subsequently to one of the plurality of curing workstations, control the robotic arm to submerge each object of the sequence of objects in each of the plurality of liquid immersion workstations, and control the articulated robotic hand to oscillate the each object of the sequence of objects while each object of the sequence of objects is submerged in each of the plurality of liquid immersion workstations, wherein the series of sequential workstations are located adjacent to one another such that the robotic arm is operable to carry the sequence of objects along the arcuate path in one circumferential direction to each of the successive workstations located in order along the arcuate path to exactly one of the plurality of curing workstations.

13. The coating system of claim 12, wherein the plurality of liquid immersion workstations extends over at least a 90-degree span about the first axis.

14. The coating system of claim 12, wherein each of the plurality of objects is a holder for containing one or more manufactured articles to be coated, each of the plurality of objects having an engagement structure thereon for engagement by the robotic hand.

15. The coating system of claim 12, wherein the arcuate path is a circumferential path positioned at a constant radius about the first axis.

16. The coating system of claim 15, wherein the plurality of curing workstations are also positioned along the arcuate path.

17. The coating system of claim 12, further comprising a loading zone positioned at an upstream end of the arcuate path adjacent a first one of the plurality of liquid immersion workstations.

18. The coating system of claim 12, wherein the articulated robotic arm includes at least three pivot axes providing separate axes of rotation between segments thereof.

19. The coating system of claim 12, wherein the robotic hand is supported on the robotic arm by a multi-degree-of-freedom wrist joint.

20. The coating system of claim 12, wherein each of the plurality of liquid immersion workstations is wedge-shaped in top plan view.

21. The coating system of claim 12, wherein the plurality of curing workstations includes at least three curing workstations.

* * * * *